United States Patent

Choi et al.

[11] Patent Number: 5,870,373
[45] Date of Patent: Feb. 9, 1999

[54] OPTICAL PICK-UP DRIVING APPARATUS

[75] Inventors: In Ho Choi; Ho Man Park, both of Sungnam, Rep. of Korea

[73] Assignee: LG Electronics Inc., Seoul, Rep. of Korea

[21] Appl. No.: 966,700

[22] Filed: Nov. 10, 1997

Related U.S. Application Data

[63] Continuation of Ser. No. 599,162, Feb. 9, 1996, abandoned.

[51] Int. Cl.$^6$ ................................................ G11B 17/00
[52] U.S. Cl. ........................................................ 369/244
[58] Field of Search ...................... 369/244, 44.14–44.17, 369/44.21–44.23, 43; 359/813–814, 823–824, 827

[56] References Cited

U.S. PATENT DOCUMENTS

| | | | |
|---|---|---|---|
| 4,759,005 | 7/1988 | Kasahara | 369/44 |
| 4,998,802 | 3/1991 | Kasuga et al. | 359/813 |
| 5,408,451 | 4/1995 | Noda et al. | 369/244 |
| 5,442,606 | 8/1995 | McCaslin et al. | 369/44.14 |
| 5,513,047 | 4/1996 | Matsui | 369/44.14 |
| 5,541,898 | 7/1996 | Kasuga et al. | 369/44.14 |

Primary Examiner—Allen T. Cao

[57] ABSTRACT

An improved optical pick-up apparatus capable of simplifying the construction of a tracking coil and a focussing coil and more easily assembling the system by providing fine-patterned tracking coil and focussing coil, which generate a driving force so as to drive an objective lens, which includes an objective lens for condensing a light; an objective lens holder for supporting the objective lens; a yoke engaged to the objective lens holder and having a permanent magnet; and a fine-patterned coil provided with a tracking fine-patterned portion and a focusing fine-patterned portion, engaged to the objective lens holder, and constituting a magnetic circuit with the permanent magnet.

11 Claims, 8 Drawing Sheets

OPTICAL PICK-UP DRIVING APPARATUS

This application is a continuation, of application Ser. No. 08/599,162 filed on Feb. 9, 1996, now abandoned.

BACKGROUND OF THE INVENTION

1. Field of the Invention

The present invention relates to an optical pick-up driving apparatus, and particularly to an improved optical pick-up apparatus for simplifying the construction of a tracking coil and a focusing coil and providing a more efficient assembling process of the system by using a fine-patterned tracking coil and a fine-patterned focusing coil, which generates a driving force to drive an objective lens.

2. Description of the Conventional Art

Figure 1:
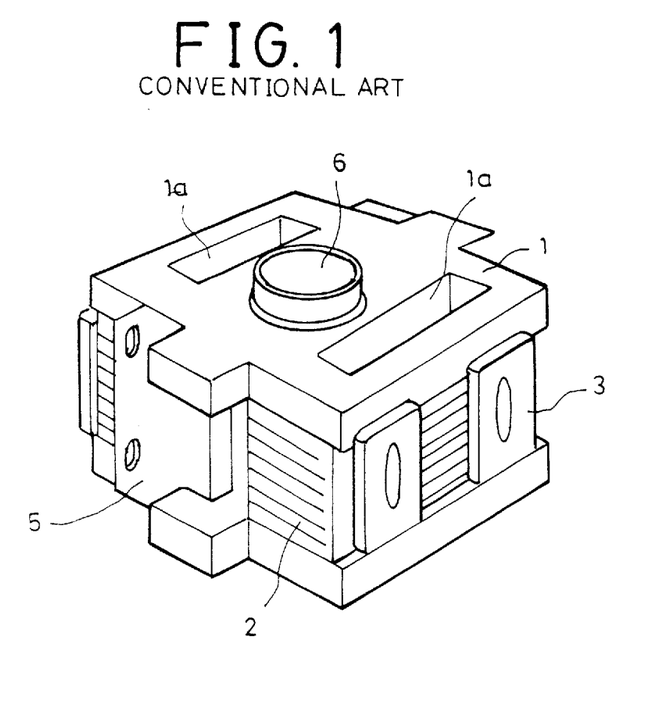
FIG. 1 is a perspective view showing a conventional optical pick-up driving apparatus.
Figure 2:
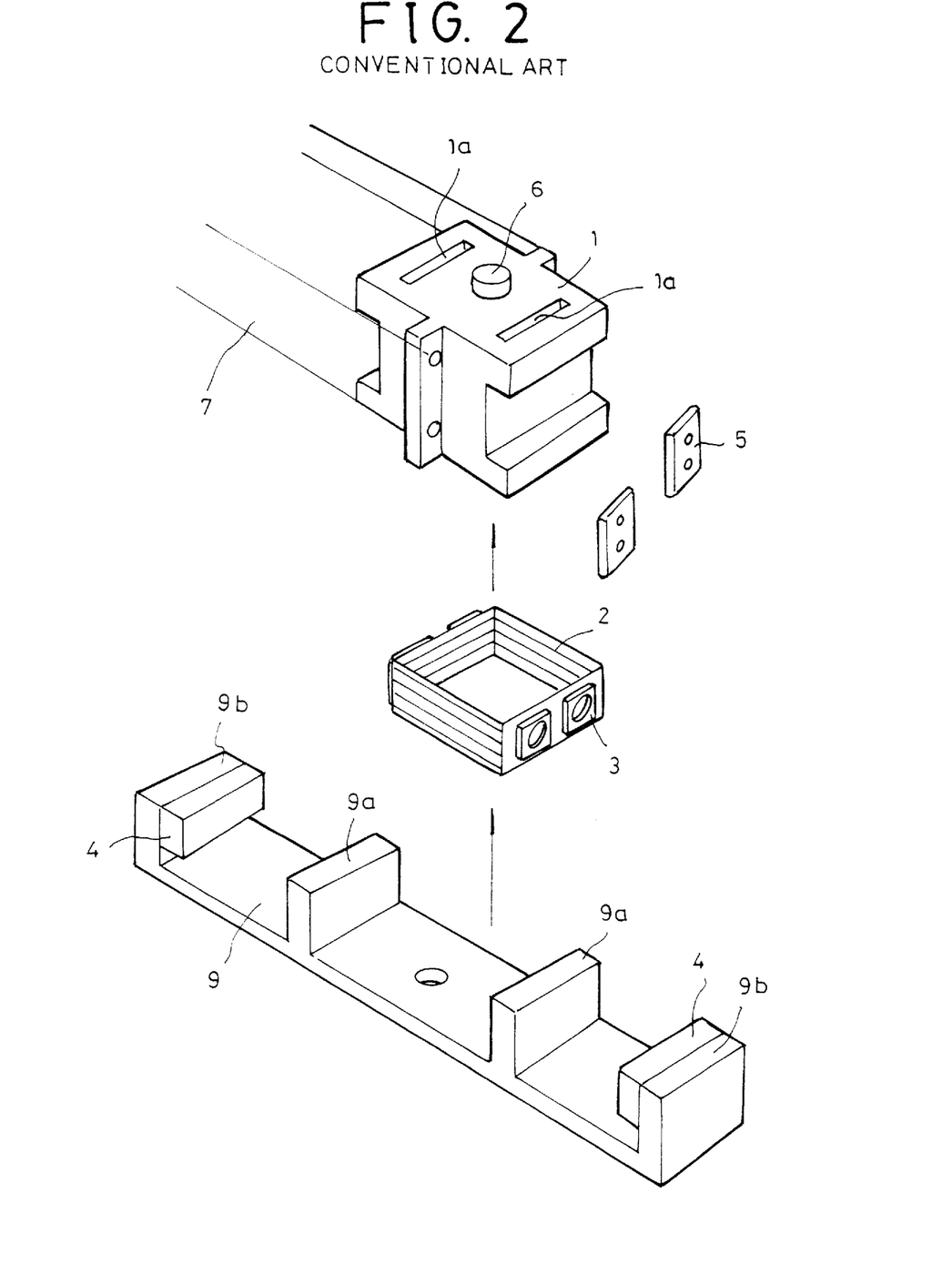
FIG. 2 is a disassembled perspective view showing a conventional optical pick-up driving apparatus.

Referring to FIGS. 1 and 2, a conventional optical pick-up driving apparatus includes an objective holder 1 which surrounds an objective lens 6 for supporting the objective lens 6, and a printed circuit board (PCB) 5 mounted at one side of the objective holder 1.

Figure 4A:
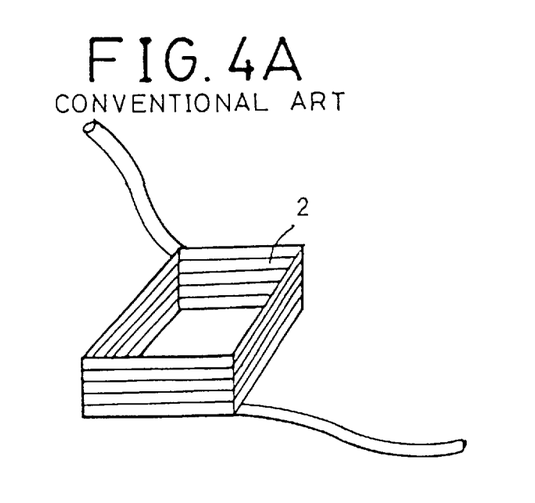
FIG. 4A is a perspective view of a conventional focussing coil.

Referring to FIG. 4A, a focusing coil 2 is wound around an outer surface of the objective holder 1 and has a certain height.

Figure 3A:
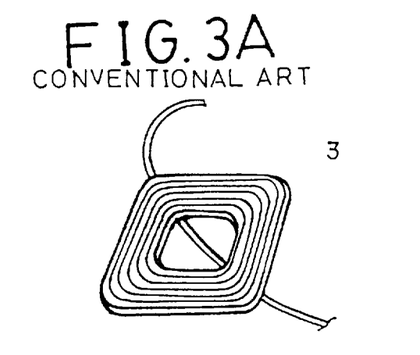
FIG. 3A is a perspective view of a conventional tracking coil.

In addition, as shown in FIGS. 2 and 3A, a plurality of snail-shaped tracking coils 3 are mounted on a left-side surface and a right-side surface of the focusing coil 2, respectively.

The focusing coil 2 and the tracking coil 3 are electrically connected to a predetermined portion of the PCB 5 by an electrical interconnection therebetween.

Meanwhile, a plurality of rectangular insertion grooves 1a, which each extends from the top surface of the objective lens holder 1 through to the bottom surface thereof, are formed within the objective lens holder 1.

In addition, as shown in FIG. 2, a plurality of rectangular-shaped feet 9a are formed, which are inserted into insertion holes 1a of the objective lens holder 1, and yokes 9 each having a permanent magnet 4 (for generating a certain magnetic force in cooperation with the focusing coil 2 and the tracking coil 3) are provided between left-side feet 9a and 9b and between right-side feet 9a and 9b.

The objective lens holder 1, around which the focusing coil 2 having the tracking coils 3 is wound, includes the insertion grooves 1a into which the feet 9a are inserted.

In the drawings, reference numeral 7 denotes a wire spring connected to the objective holder 1.

Figure 3B:
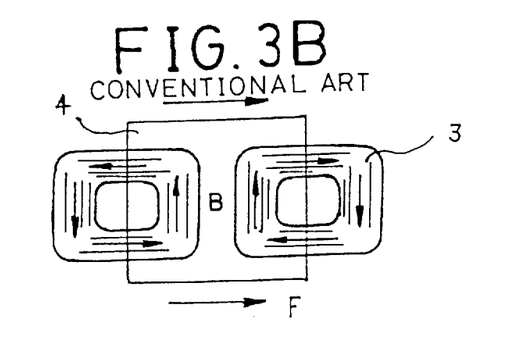
FIG. 3B is a plan view showing a conventional tracking coil so as to show a magnetic field direction and a forcing direction thereof which occur by the tracking coil.

Because the permanent magnets 4 and the tracking coil 3 of the conventional optical pick-up apparatus are directed to generating a certain magnetic field, when current is supplied to the tracking coil 3, as shown in FIG. 3B, the optical driving-apparatus is driven in the tracking direction in cooperation with the left-side and right-side direction magnetic force based on Fleming's left hand theory (F=B*I*L).

In FIG. 3B, reference character "B" denotes the direction of magnetic field, and reference character "F" denotes the direction of magnetic force.

In addition, when current is applied to the focusing coil 2, the optical pick-up driving apparatus is driven in the upward and downward directions due to the magnetic force based on Fleming's left hand theory (F=B*I*L).

Figure 4B:
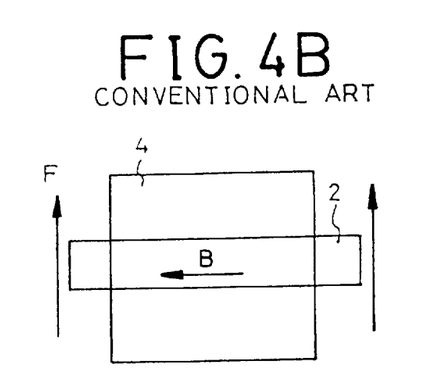
FIG. 4B is a plan view showing a conventional focussing coil so as to show a magnetic field direction and a forcing direction thereof which occur by the focussing coil.

In FIG. 4B, reference character "B" denotes the direction of magnetic field, and reference character "F" denotes the direction of magnetic force.

However, the conventional optical pick-up driving apparatus has disadvantages in that a printed circuit board is additionally necessary for electrically connecting the focusing coil and the tracking coil so as to supply voltage to the focusing coil and the tracking coil. In addition, winding apparatuses for winding the focusing coil around the outer surface of the objective lens holder and for forming the tracking coil, and an assembling apparatus are additionally necessary, thereby increasing manufacturing cost of the product.

Moreover, when manufacturing the focusing coil and tracking coil, manufacturing errors occur since the focusing coil and tracking are manually assembled by mechanical process, so that the performance of the optical pick-up driving apparatus is decreased.

SUMMARY OF THE INVENTION

Accordingly, it is an object of the present invention to provide an optical pick-up driving apparatus, which overcome the problems encountered in a conventional optical pick-up apparatus.

It is another object of the present invention to provide an improved optical pick-up apparatus for simplifying the construction of a tracking coil and a focussing coil and providing a more efficient assembling process of the system by providing a fine-patterned tracking coil and a fine-patterned focussing coil, which generate a driving force to drive an objective lens.

To achieve the above objects, there is provided an optical pick-up apparatus which includes an objective lens for condensing a light; an objective lens holder for supporting the objective lens; a yoke engaged to the objective lens holder and having a permanent magnet; and a fine-patterned coil provided with a tracking fine-patterned portion and a focusing fine-patterned portion, engaged to the objective lens holder, and constituting a magnetic circuit with the permanent magnet.

DETAILED DESCRIPTION OF THE INVENTION

An optical pick-up driving apparatus according to the present invention is basically directed to integrally forming a focussing coil and a tracking coil as a fine-patterned coil, so that it is possible to track and focus in cooperation with the fine-patterned coil.

Since the construction of the optical pick-up driving apparatus is the same as the conventional optical pick-up driving apparatus except for the construction of the fine-patterned coil, only the different construction will be explained.

Figure 5:
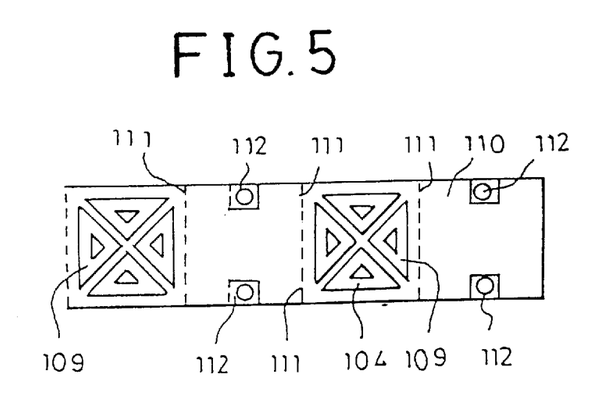
FIG. 5 is a view showing a fine-patterned coil adopted in an optical pick-up driving apparatus of a first embodiment according to the present invention.
Figure 6:
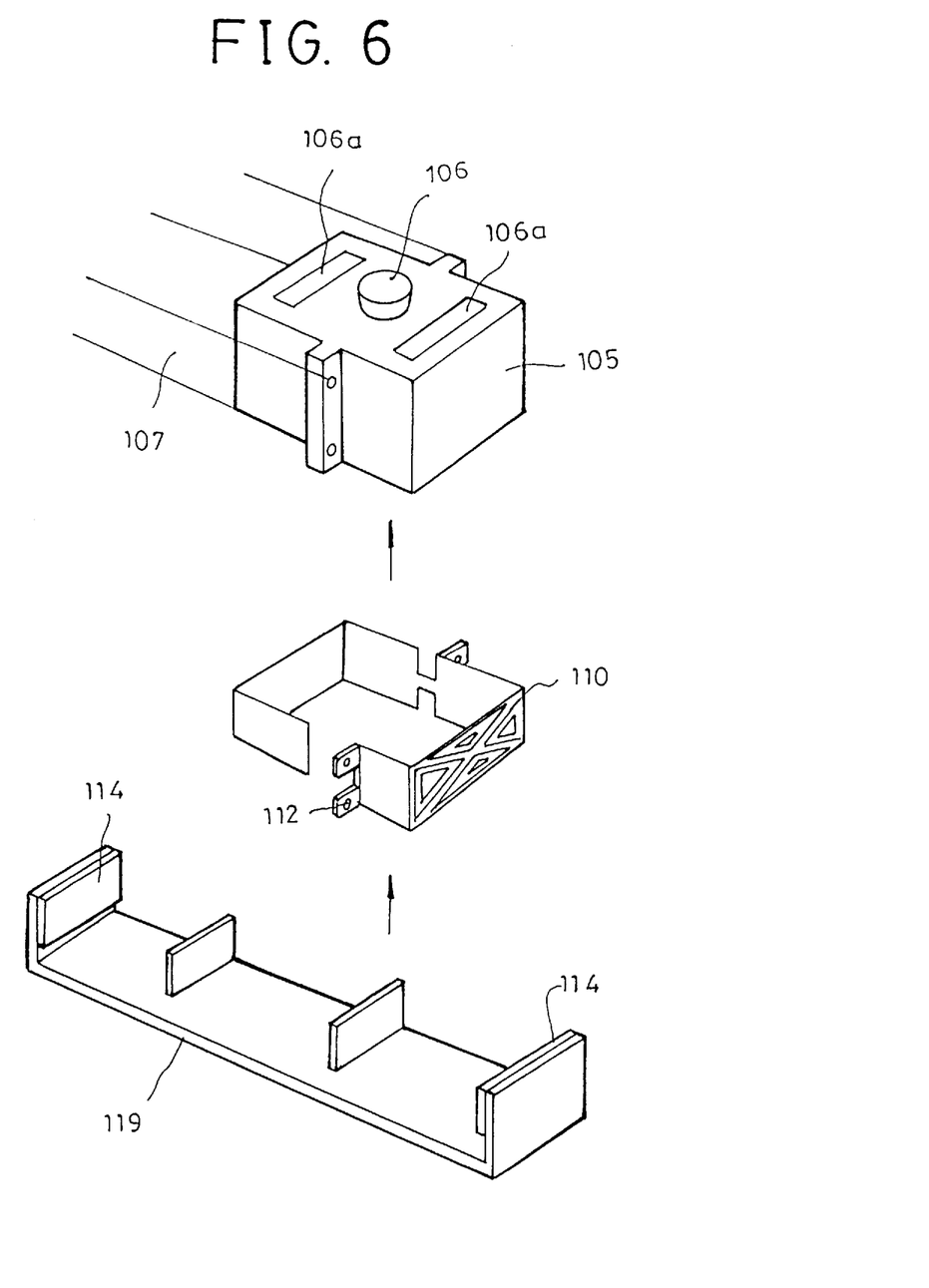
FIG. 6 is a perspective view showing an optical pick-up driving apparatus of a first embodiment according to the present invention.

To begin with, a focussing coil and a tracking coil of the optical pick-up driving apparatus of a first embodiment according to the present invention are integrally formed on a fine-patterned coil 110 as shown in FIGS. 5 and 6.

The fine-patterned coil 110 is formed like a band having a certain width and forms an upper and lower portions-opened rectangular box when folding it.

That is, when folding the fine-patterned coil 110 about folding lines 111, a tracking fine-patterned portion 109 and a focusing fine-patterned portion 104 are formed on the same surface of the band-shaped fine-patterned coil 110. In more detail, the tracking fine-patterned portion 109 and the focusing fine-patterned portion 104 are formed on two surfaces thereof. In addition, a plurality of welding portions 112 are formed on the remaining two surfaces and welded to a predetermined portion of the objective lens holder 105.

The focusing fine-patterned portion 104 is formed with a pair of spaced-apart triangle-shaped patterns so as to effectively control focusing operation in the upward and downward directions, and the tracking fine-patterned portion 109 is formed with a pair of spaced-apart triangle-shaped patterns so as to effectively control tracking operation in the leftward and rightward directions. As a result, the focusing fine-patterned portion 104 and the tracking fine-patterned portion 109 together occupy a rectangular area.

The tracking fine-patterned portion 109 and the focusing fine-patterned portion 104 are formed on the same surface of the fine-patterned coil 110 which is spaced apart from the permanent magnet 114 mounted at both ends of the yoke 119 so as to generate a certain magnetic field in cooperation with the fine-patterned coil 110.

In the drawings, reference numeral 106a denotes an insertion groove formed at the objective lens holder, 113 denotes the direction of current, 106 denotes an objective lens, and 107 denotes a wire spring.

Figure 8:
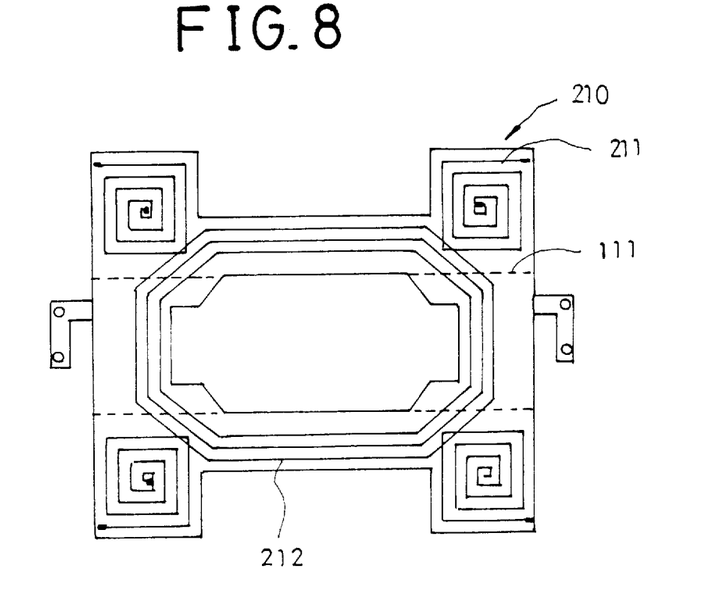
FIG. 8 is a view showing a fine-patterned coil adopted in an optical pick-up driving apparatus of a second embodiment according to the present invention.
Figure 9:
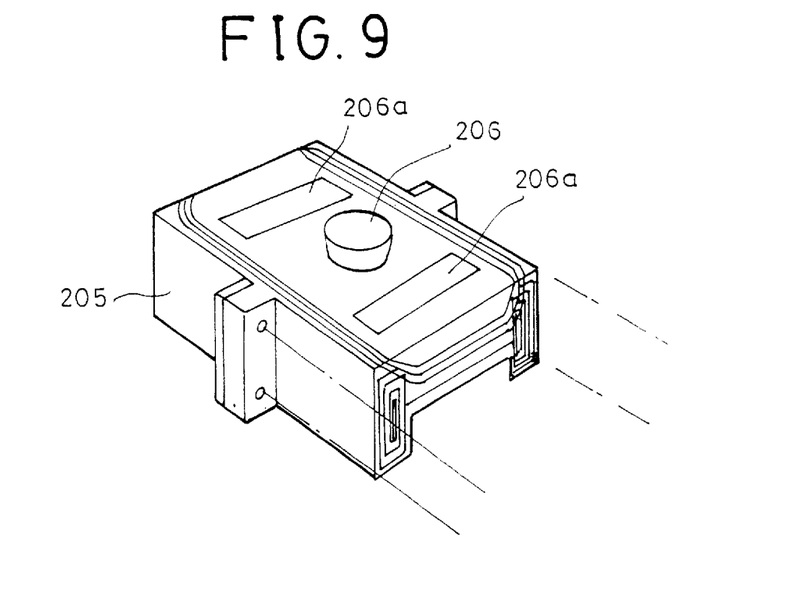
FIG. 9 is a perspective view showing a fine-patterned coil adopted in an optical pick-up driving apparatus of a second embodiment according to the present invention.

Meanwhile, FIG. 8 shows an optical pick-up driving apparatus of a second embodiment according to the present invention, which includes a tracking fine-patterned portion 211 engaged to the outer surface of the objective lens holder 205 and formed at both sides of the objective lens holder 205 so as to generate a certain magnetic field in cooperation with the permanent magnet 214, and a focusing fine-patterned portion 212 formed at the central portion of the left-side and right-side surfaces of the objective lens holder 205.

In the drawings, reference numeral 206a denotes an insertion groove formed at the objective lens holder, and 111 denotes folding lines 111.

Figure 7A:
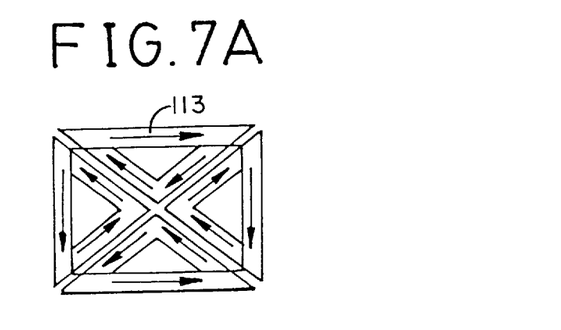
FIG. 7A is a view showing a fine-patterned coil adopted in an optical pick-up driving apparatus so as to show an operational state of a first embodiment according to the present invention.
Figure 10A:
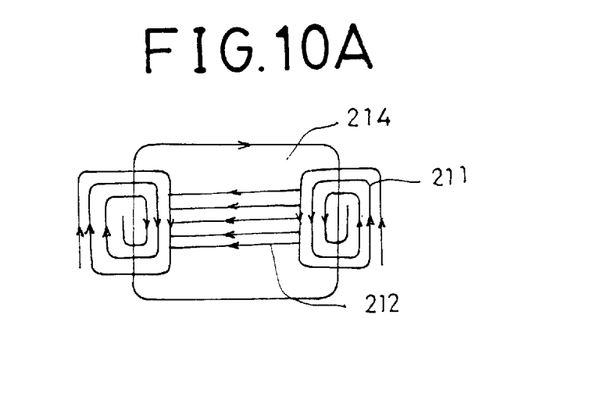
FIG. 10A is a view showing a fine-patterned coil adopted in an optical pick-up driving apparatus so as to show an operational state of a second embodiment according to the present invention.

As described above, referring to FIGS. 7A and 10A, the tracking and focusing, which are the objects of the first and second embodiments according to the present invention, can be achieved using only either the tracking fine-patterned portion 109 or the tracking fine-patterned portion 211.

The forces generated by the tracking fine-patterned portions 109 and 211 and the focusing fine-patterned portions 104 and 212 are directed to driving the objective lenses 106 and 206 based on Fleming's left hand theory (F=B*I*L).

Figure 7B:
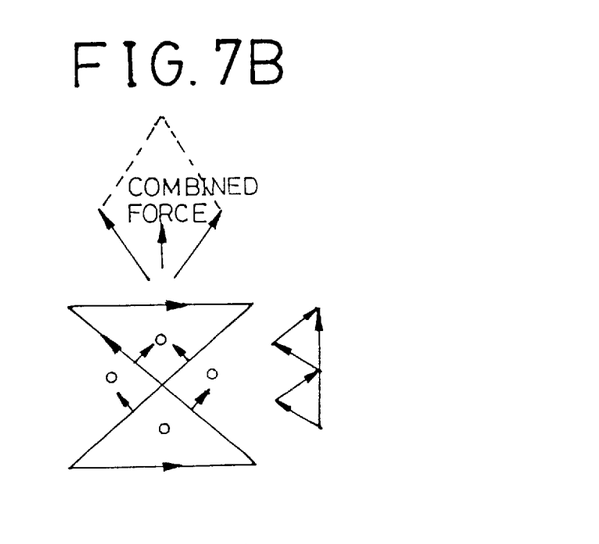
FIG. 7B is a view showing a focussing fine-patterned coil adopted in an optical pick-up driving apparatus so as to show an operational state of a first embodiment according to the present invention.

In more detail, FIG. 7B shows a direction of a combined force between a current supplying direction 113 for focusing of the focusing fine-patterned portion 104 of the fine-patterned coil 110 which is spaced apart from the permanent magnets 114 and 214 so as to form a proper magnetic field and a focusing direction based on the flow of the current thereof.

Figure 7C:
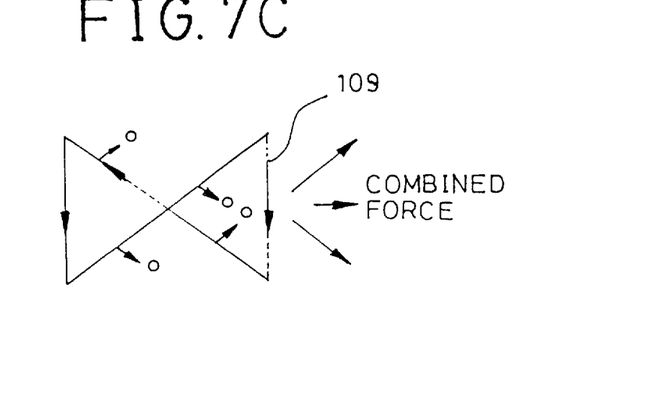
FIG. 7C is a view showing a tracking fine-patterned coil adopted in an optical pick-up driving apparatus so as to show an operational state of a first embodiment according to the present invention.

In addition, FIG. 7C shows a direction of a combined force between a current supplying direction 113 for tracking of the tracking fine-patterned portion 109 of the fine-patterned coil 110 which is spaced apart from the permanent magnet 114 so as to form a proper magnetic field and a tracking direction based on the flow of the current thereof.

Figure 10B:
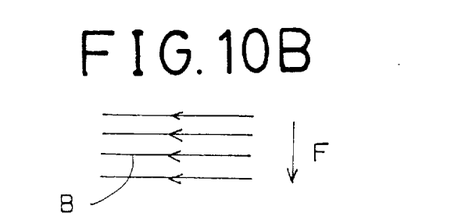
FIG. 10B is a view showing a focussing fine-patterned coil adopted in an optical pick-up driving apparatus so as to show an operational state of a second embodiment according to the present invention.
Figure 10C:
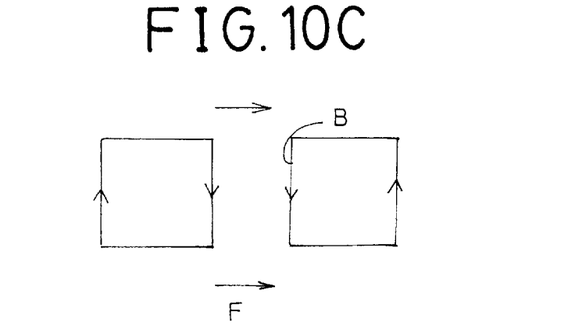
FIG. 10C is a view showing a tracking fine-patterned coil adopted in an optical pick-up driving apparatus so as to show an operational state of a second embodiment according to the present invention.

In FIG. 10B, reference character "B" denotes the direction of magnetic field of the focusing fine-patterned coil 104 of the second embodiment according to the present invention, and "F" denotes the direction of a focusing force. In addition, in FIG. 10C, reference character "B" denotes the direction of magnetic field of the tracking fine-patterned coil 109 of the second embodiment according to the present invention, and "F" denotes the direction of a tracking force.

As described above, the optical pick-up driving apparatus according to the present invention is directed to integrally providing the focusing coil and the tracking coil on the same surface, so that an interconnecting process between the tracking coil and the focusing coil is not necessary.

In addition, it is possible to reduce the number of the assembling processes, and a thinner product is possible as compared to the prior art. Moreover, it is possible to reduce manufacturing errors, so that performance of the optical pick-up driving apparatus can be increased.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An optical pick-up driving apparatus, comprising:
an objective lens for condensing light;

an objective lens holder for supporting said objective lens;

a yoke for supporting said objective lens holder, said yoke having at least one magnet; and a fine-patterned coil structure, formed on said objective lens holder, said coil structure having a fine-patterned tracking portion and a fine-patterned focusing portion, said fine-patterned tracking portion and said fine-patterned focusing portion being disposed together on a planar surface to one side of said objective lens holder, each of said fine-patterned focusing portions and said fine-patterned tracking portions being arranged into at least two triangular shapes, said coil structure and said at least one magnet constituting a magnetic circuit.

2. The apparatus of claim 1, wherein said objective lens holder is rectangular in shape.

3. The apparatus of claim 1, wherein said fine-patterned focusing portion controls a focusing operation to move said objective lens holder in an upward and downward direction.

4. The apparatus of claim 1, wherein said fine-patterned tracking portion controls a tracking operation to move said objective lens holder in a left direction and right direction.

5. The apparatus of claim 1, wherein said at least one magnet directly faces said fine-patterned focusing portion and said fine-patterned tracking portion.

6. The apparatus of claim 1, wherein each of said fine-patterned focusing portions and said fine-patterned tracking portions are arranged into two opposing triangular shapes that define an hour-glass shape, said hour-glass shapes on said respective planar surfaces being oriented perpendicularly to one another to define rectangular areas.

7. The apparatus of claim 6, wherein each of said rectangular areas is a square.

8. The apparatus of claim 1, wherein said side of said objective lens holder having said fine-patterned focusing portion and said fine-patterned tracking portion thereon faces said at least one magnet.

9. The apparatus of claim 1, wherein said at least one magnet is a permanent magnet.

10. The apparatus of claim 1 further comprising:

a first and second magnet on opposing sides of said objective lend holder.

11. The apparatus of claim 1, wherein:

said side of said objective lens holder is a first side thereof, said fine-patterned tracking portion is a first fine-patterned tracking portion and said planar surface is a first planar surface;

said coil structure has a second fine-patterned tracking portion and a second fine-patterned tracking portion disposed on a second planar surface to a second side of said objective lens holder, said second planar surface being parallel to said first planar surface and said second side being located across said objective lens holder from said first side, each of said second fine-patterned focusing portions and said second fine patterned tracking portions being arranged into at least two triangular shapes.

* * * * *

UNITED STATES PATENT AND TRADEMARK OFFICE
CERTIFICATE OF CORRECTION

| | |
|---|---|
| PATENT NO. | : 5,870,373 |
| APPLICATION NO. | : 08/966700 |
| DATED | : February 9, 1999 |
| INVENTOR(S) | : In Ho Choi et al. |

Page 1 of 1

It is certified that error appears in the above-identified patent and that said Letters Patent is hereby corrected as shown below:

Title Page - item 30 Insert

--1)  Foreign priority KR25380/1994 filed 10/04/1994 was claimed properly on declaration, but does not appear on face of issued patent.--

Signed and Sealed this

Thirty-first Day of March, 2009

JOHN DOLL
*Acting Director of the United States Patent and Trademark Office*